Figure 1:
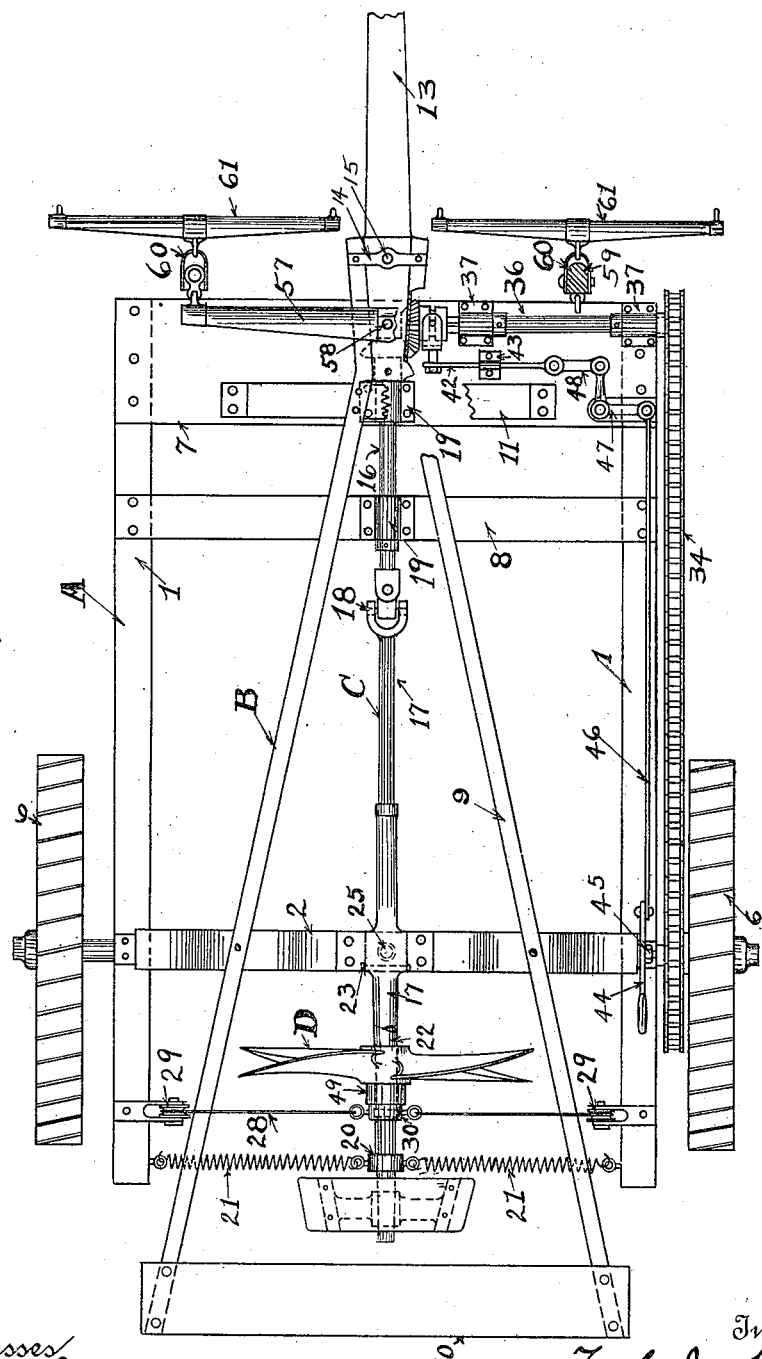

No. 885,654. PATENTED APR. 21, 1908.
T. J. SMITH.
COTTON CHOPPER.
APPLICATION FILED JULY 12, 1907.

5 SHEETS—SHEET 1.

Witnesses
Jno. W. Dady
M. D. Phillips

Inventor
Taylor J. Smith
Joshua R. H. Potts
Attorney

No. 885,654. PATENTED APR. 21, 1908.
T. J. SMITH.
COTTON CHOPPER.
APPLICATION FILED JULY 12, 1907.

5 SHEETS—SHEET 3.

Witnesses
Jno. W. Dady
N. D. Phillips

Inventor
Taylor J. Smith
John R. H. Potts
Attorney

THE NORRIS PETERS CO., WASHINGTON, D. C.

No. 885,654. PATENTED APR. 21, 1908.
T. J. SMITH.
COTTON CHOPPER.
APPLICATION FILED JULY 12, 1907.
5 SHEETS—SHEET 4.
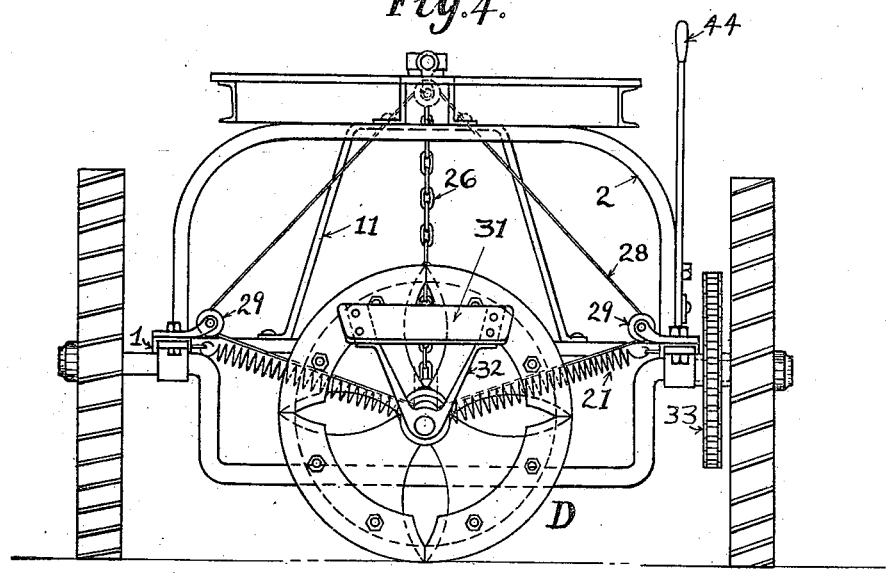
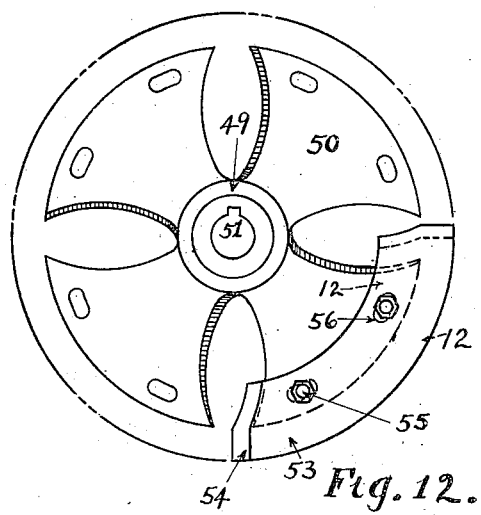
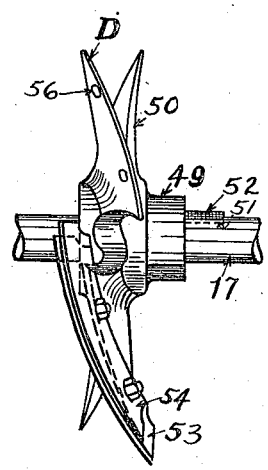
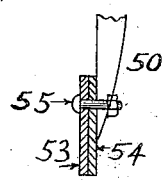
Witnesses
Jno. W. Dady
N. D. Phillips
Inventor
Taylor J. Smith
per
Joshua R. H. Potts
Attorney No. 885,654. PATENTED APR. 21, 1908.
T. J. SMITH.
COTTON CHOPPER.
APPLICATION FILED JULY 12, 1907.
5 SHEETS—SHEET 5.
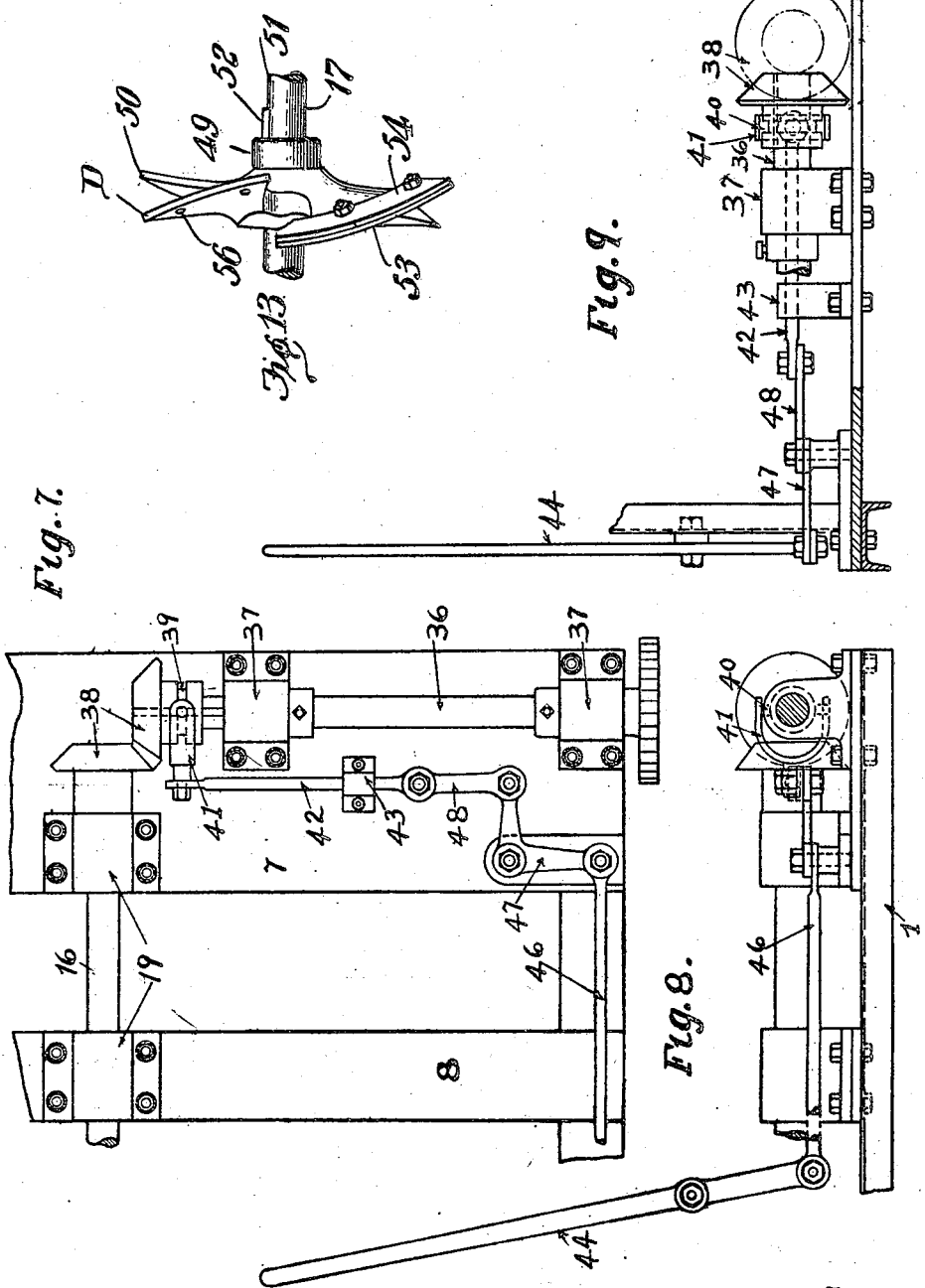

UNITED STATES PATENT OFFICE.

TAYLOR J. SMITH, OF ENSLEY, ALABAMA.

COTTON-CHOPPER.

No. 885,654.  Specification of Letters Patent.  Patented April 21, 1908.

Application filed July 12, 1907. Serial No. 383,454.

*To all whom it may concern:*

Be it known that I, TAYLOR J. SMITH, a citizen of the United States, residing at Ensley, in the county of Jefferson and State of Alabama, have invented certain new and useful Improvements in a Cotton-Chopper, of which the following is a specification.

This invention relates to agricultural implements and relates more particularly to a chopping machine intended primarily for use in cotton fields although it is not necessarily limited to this use.

The invention has for one of its objects to improve and simplify the construction and operation of machines of this character so as to be comparatively inexpensive and easy to manufacture thoroughly reliable and efficient in use and convenient to manipulate.

A further object of the invention is the provision of a revolving chopping element provided with blades arranged so that the superfluous cotton plants can be cut out without disturbing the plants allowed to remain in the row, the chopping element having a motion somewhat like that of an auger whereby the plants can be removed by a lateral displacement without shock and disturbance as is common with those choppers that cut with quick strokes, and in this connection it might be remarked that in cotton cultivation it is highly important that the soil around the plants permitted to remain is not in the least disturbed by the operation of the chopper since the plants are extremely delicate and will wither and die if disturbed.

A further object of the invention is the provision of a wheeled cotton chopping machine provided with means whereby the chopping element can be readily thrown into or out of operation from the driver's seat and whereby the position of the element can be conveniently changed by hand or foot to vary the depth of penetration of the blades and to bring the element into proper relation to the row.

Another object is to provide a longitudinal driving shaft for the element including a universal joint whereby the element can be moved to any desired position while rotating, the power being derived from one of the ground wheels of the machine. And another object is the provision of a cutting element comprising a body in the form of a propeller on which are arranged blades or knives adapted to be adjusted to vary the number of plants allowed to remain in the row.

With these objects in view and others as will appear as the description proceeds, the invention comprises the various novel features of construction and arrangement of parts which will be more fully described hereinafter and set forth with particularity in the claims appended hereto.

Figure 2:
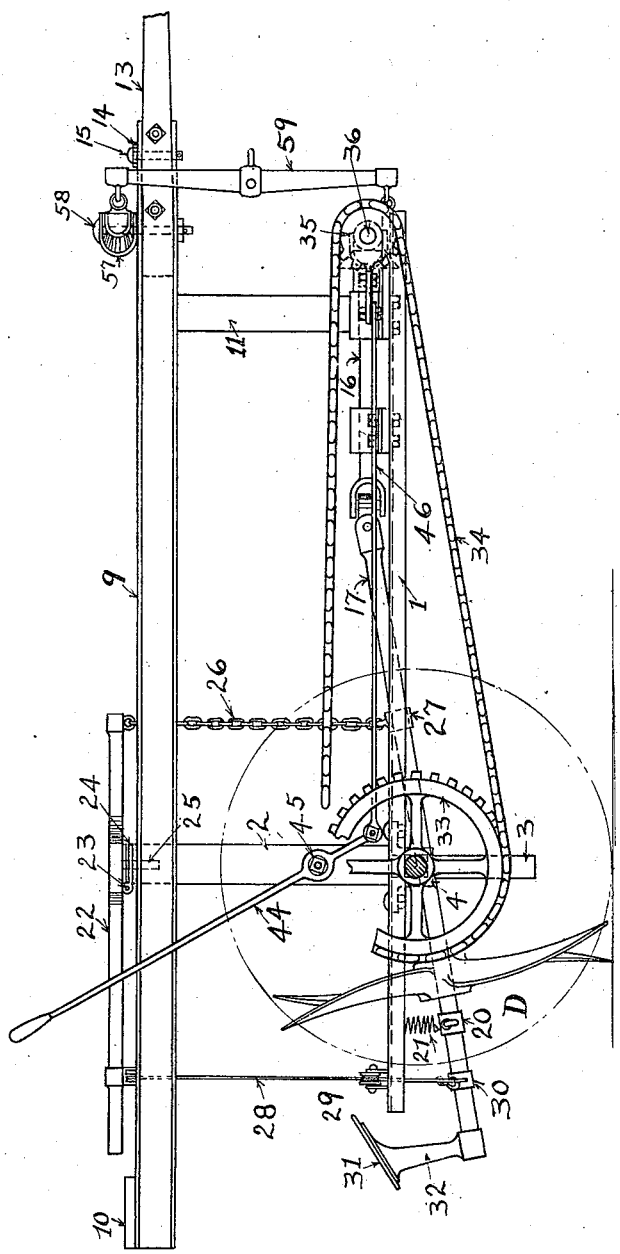
Figure 3:
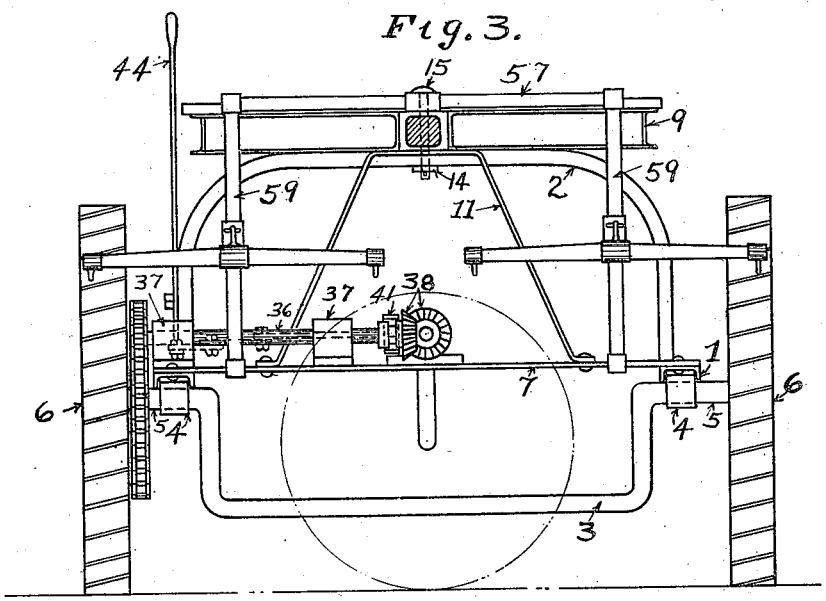
Figure 10:
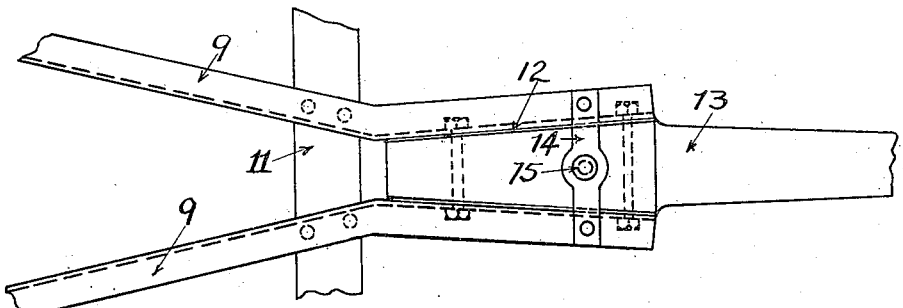
Figure 11:
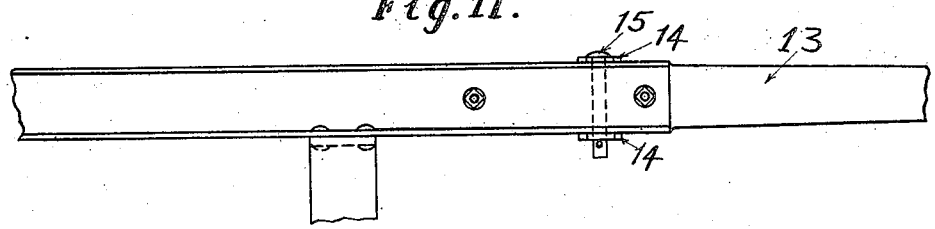

In the accompanying drawing which illustrates one of the embodiments of the invention, Figure 1 is a plan view of the machine with portions broken away to reveal the details of construction. Fig. 2 is a side view of the machine with the wheels removed. Fig. 3 is a front view of the machine. Fig. 4 is a rear view of the machine. Figs. 5 and 6 are enlarged detail views of the chopping element showing the blades extended. Fig. 7 is an enlarged plan view of the front portion of the machine showing the clutching mechanism. Figs. 8 and 9 are respectively a front and a side view of the parts shown in Fig. 7 with portions being broken away. Fig. 10 is a plan view of the connection between the tongue and the frame of the machine. Fig. 11 is a side view thereof. Fig. 12 is a section on line 12—12 Fig. 5. Fig. 13, is an enlarged view of the chopping element showing the blades flush with the arm.

Referring to the drawing, A designates the rectangular main frame of the machine, and B the triangular secondary frame thereof, the frames being made largely of beams of channel iron or any other suitable material. The side beams 1 of the frame A are connected near their rear ends by an arched cross member 2 and directly under the same is an inverted arched axle 3 Fig. 3, which is securely fastened to the beams by clips 4 or any other suitable means, the ends of the axle being prolonged beyond the main frame to form spindles 5 on which the wheels 6 rotate. The front ends of the side beams 1 are connected by a horizontal transversely extending plate 7 and to the rear thereof is a cross piece 8. The frame B is composed of forwardly converging channel beams 9 that project at their rear ends beyond the main frame A and have secured thereto a seat 10 whereby the weight of the operator tends to counter-balance the front end of the machine. The beams 9 are secured to the arched cross member 2 and to an inverted U shaped bracket 11 rising from the front plate 7, the front ends of the beams being spaced apart and slightly bent to form an inwardly converging mouth or socket 12 as shown in Fig. 10 for the reception of the rear end of the tongue 13 of the machine. To the front ends of the beams 9 are connected top and bottom cross pieces 14 as clearly shown in Fig. 11 that are apertured for receiving a bolt 15 that passes through the tongue to hold the latter in place.

Extending centrally of the machine is a driving shaft C composed of two sections 16 and 17 connected by a universal joint 18, the section 16 being mounted in bearings 19 on the front plate 7 and cross member 8 as clearly shown in Figs. 1, 7 and 8. The section 17 carries adjacent its rear end and at a point in front of the operator's seat a chopping element or cutter D. On the shaft is a collar 20 in which the shaft rotates and connected to the collar are helical extension springs 21 that are connected to the side beams 1, of the main frame so as to centralize the rear end of the swinging section 17 of the driving shaft C.

The operator is capable of throwing the chopping element into any desired position during the operation of the machine and for this purpose an operating lever 22 is arranged in front of the seat so that the free end thereof can be conveniently grasped, the lever being mounted to turn on horizontally and vertically disposed axes so as to raise and lower the chopper-carrying-shaft or move it horizontally to one side or the other or in any direction intermediate the vertical and horizontal. In other words the lever is mounted for universal movement, and according to one employment of this feature a hinge 23 is secured to the bottom side of the lever and to the top of the arched cross member 2, the lower leaf 24 being connected by a vertical pivot bolt 25 that extends into the cross member 2 so that the lever can turn on the latter as a vertical axis and on the hinge 23 as a horizontal axis. The front end of the lever is connected by a flexible element such as a chain 26 with the swinging section of the shaft 17 of the shaft C by means of a collar 27 so that the said section and chopper can be raised by depressing the handle end of the lever and lowered by raising the said end of the lever. Adjacent the handle end of the lever is attached a flexible element 28 that extends from opposite sides of the lever downwardly and pass around pulleys 29 on the side beams 1 of the frame A and connect with a collar 30 at the rear end of the shaft section 17 as clearly shown in Figs. 1, 2 and 4 so that by moving the operating lever laterally in one direction one cord will pull the shaft section 17 in the opposite direction while the other cord is loose and vice versa when the lever is moved in the opposite direction. As a further means for shifting the shaft section 17 the foot board or rest 31 supported by a V shaped frame 32 Figs. 2 and 4 is employed, whereby the operator can assist in the movement of the shaft and furthermore the shaft can be held depressed or steadied by the operator bearing on the rest with his feet.

The driving shaft C is preferably operated by power derived from one of the ground wheels 6 and for this purpose one of the wheels is provided with a sprocket wheel 33 from which passes a sprocket chain 34 to impart movement to a small sprocket wheel 35. The small sprocket wheel 35 is secured to a transversely extending shaft 36 mounted for rotation in bearings 37 on the front plate 7 as clearly shown in Figs. 1, 3, 7, and 9. Intermediate the inner end of the shaft 36 and front section 16 of the shaft C is a bevel gearing 38 one gear of which is feathered on the shaft 36 so that it can be thrown into and out of engagement with the other member of the gearing thereby permitting the chopper member of the shaft to remain idle when occasion requires. The gear on the shaft 36 has a peripheral groove 39 in its hub and engaging in the same on the pins 40 Figs. 7 to 9 inclusive on fork 41 which latter is attached to a longitudinally extending connecting rod 42 slidable in the bearings 43 on the main frame. The rod 42 is connected by a lever 44 fulcrumed on the member 2 at 45 Figs. 1 and 2, the connection between the lever 44 and the connecting rod 42 consisting of a connecting rod 46 and bell crank lever 47 fulcrumed on the front plate 7 and the link 48 between the bell crank lever and the rod 42. By throwing the operating lever forwardly the members of the gearing 38 disengage and the reverse movement will connect the said members.

The chopping element D as shown more clearly in Figs. 5 and 6 comprises a body cast or otherwise suitably formed having a hub 49 through which the shaft section 17 extends and from which hub projects arms 50 that are arranged after the fashion of a screw or propeller of a vessel. The hub has a keygroove 51 for receiving a key 52 whereby the chopper device is secured to the section 17 of the shaft C. On each arm 50 is a pair of over-lapping arcuate blades 53 and 54 that are secured to the blade of the cast portion of the chopper by bolts 55, the blades having elongated slides 56 for receiving the bolts whereby the blades are capable of relative adjustment. When the ends of the blades are coincident the maximum number of plants are permitted to remain in the row by the chopper, and by lengthening the blades the number of plants permitted to remain can be diminished, for instance, when the blades on each member coincide the chopper will leave 3 inches of cotton unchopped or remaining in the row and if this is found to be too much the blades are extended so that less cotton will be left. Since the arms 50 are disposed with their outer edges obliquely to the plane of rotation of the chopping element the blades enter the soil with a screw like effect the rear end of the blade enters first and the point of penetration passes along the blade from the rear end thereof until the blade passes entirely out of the soil and as the entering end of the next blade is removed from the leaving end of the preceding blade a portion of the row is left undisturbed so that the plants are not chopped out. In other words, the blades do not strike the ground with a blow but cut the same smoothly and displace the chopped cotton to one side thereby not disturbing the roots of the cotton allowed to remain. The distance between the hills of cotton is governed by the speed at which the chopping element is rotated and this speed will have a certain relation to the rate of the speed at which the machine is driven over the ground and in practice it will be preferable to so proportion the parts as to leave hills 10 inches apart. In other words if the chopping element revolves one-quarter of a revolution for every ten inches of travel of the machine it will leave hills ten inches apart, and the distance between the hills of the machine can be governed by the proportion of the parts of the power giving and transferring elements, since there are four blade carrying arms in the chopping element.

Since the body structure of the machine is composed of an upper and a lower frame A and B a draft device of special form has been devised for attaching draft animals to the machine. This draft device comprises a horizontally extending equalizing member 57 Figs. 1, 2 and 3 that swings on the pin 58 passing through the tongue 12 or other suitable part and to the ends of this bar are flexibly connected vertical parts 59, and the lower ends of these vertical members or bars are flexibly connected with the main frame at the front thereof. To the middle of the parts 59 are connected by clevises 60, or the like, whiffletrees 61 to which the horses are harnessed. By this device the strain on the frames A and B is equalized so that the wear and tear are reduced to a minimum.

From the foregoing description taken in connection with the accompanying drawing the advantages of the construction and the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made when desired as are within the scope of the claims.

Having thus described my invention, what I claim is:

1. In a cotton chopper, a chopping element comprising a screw or propeller shaped body, and adjustable blades on the body at the periphery thereof, each blade consisting of a pair of relatively adjustable plates.

2. In a cotton chopper, a chopping element comprising a hub having projecting apertured arms arranged after the fashion of a screw or propeller, bolts arranged in said apertures, and a pair of overlapping blades provided with elongated slides arranged on said bolts, whereby said blades are capable of relative adjustment.

3. In a cotton chopper, the combination with a wheeled frame, of a rotatable shaft carried by said frame having a flexible joint, a chopping element carried by said shaft, springs connecting said shaft to the side beams of the frame, and an adjustable lever mounted to turn on two horizontal axes, having flexible connections with said shaft at each end.

4. In a cotton chopper, the combination with a wheeled frame, of a rotatable shaft carried by said frame, having a flexible joint, a chopping element mounted on said shaft, springs connecting said shaft to the side beams of the frame, a hinge pivotally mounted on said frame, a lever connected to the free leaf of said hinge, a chain connecting one end of said lever to said shaft, and a cable connected to the other end of said lever, passing over pulleys secured to the side beams of the frame, and connected to said shaft.

5. In a cotton chopper, the combination with a wheeled frame, of a rotatable shaft carried by said frame having a flexible joint, a chopping element carried by said shaft, a lever having a universal movement mounted on said frame connected to said shaft at each end, by flexible means, whereby said element can be swung in different positions.

In testimony whereof I have signed my name to this specification in the presence of the two subscribing witnesses.

TAYLOR J. SMITH.

Witnesses:
E. E. SMOOT,
C. H. MANDY.